(12) United States Patent
Gong et al.

(10) Patent No.: US 12,510,661 B2
(45) Date of Patent: Dec. 30, 2025

(54) METHOD FOR TARGET DETECTION BASED ON CORRELATION ANALYSIS OF SPATIAL PHASE IN AN ACOUSTIC VORTEX

(71) Applicant: Shanghai Jiao Tong University, Shanghai (CN)

(72) Inventors: Zhixiong Gong, Shanghai (CN); Liwei Chen, Shanghai (CN); Jun Fan, Shanghai (CN); Bin Wang, Shanghai (CN); Fulin Zhou, Shanghai (CN); Kaiqi Zhao, Shanghai (CN); Jie Li, Shanghai (CN); Yang Yang, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 19/182,525

(22) Filed: Apr. 17, 2025

(65) Prior Publication Data
US 2025/0347808 A1     Nov. 13, 2025

(30) Foreign Application Priority Data

May 11, 2024   (CN) .......................... 202410582905.8

(51) Int. Cl.
*G01S 15/04*     (2006.01)
*G01S 7/539*     (2006.01)
(Continued)

(52) U.S. Cl.
CPC .............. *G01S 15/04* (2013.01); *G01S 7/539* (2013.01); *G01S 15/06* (2013.01); *G01S 15/88* (2013.01)

(58) Field of Classification Search
None
See application file for complete search history.

(56) References Cited

U.S. PATENT DOCUMENTS 12,127,887 B2 * 10/2024 Jiménez ................. A61B 8/488
12,158,522 B2 * 12/2024 Iodice ..................... G06F 3/016
(Continued)

FOREIGN PATENT DOCUMENTS

CN      111307279 A     6/2020
CN      112904346 A     6/2021
(Continued)

OTHER PUBLICATIONS

Ding, Localization of off-axis multiple acoustic vortices formed by two coaxial vortex beams, Acta Acustica (Year: 2020).*

(Continued)

*Primary Examiner* — James R Hulka
*Assistant Examiner* — Vikas Atmakuri
(74) *Attorney, Agent, or Firm* — Mei & Mark LLP; Manni Li

(57) ABSTRACT

A method for target detection based on spatial phase correlation analysis of acoustic vortices comprises the steps of generating a vortex-like excitation acoustic field, receiving the scattered acoustic pressure information after the incidence of the acoustic vortex, extracting the correlation coefficient between the spatial phase of the scattered acoustic field and the reference phase matrix, and predicting the presence, size, and spatial orientation of the target to achieve the target detection function. The method breaks through the diffraction limit to detect small targets and determine their spatial positions. Using acoustic vortices as information carriers, the method provides new ideas and technical solutions for the field of target detection.

5 Claims, 6 Drawing Sheets

(51) Int. Cl.
    *G01S 15/06*     (2006.01)
    *G01S 15/88*     (2006.01)

(56) References Cited

U.S. PATENT DOCUMENTS

| | | | |
|---|---|---|---|
| 2009/0037137 A1* | 2/2009 | Takeda | G01B 11/002 702/150 |
| 2022/0330919 A1* | 10/2022 | Jiménez González | A61B 8/488 |
| 2023/0346407 A1* | 11/2023 | Jiménez González | A61B 17/2258 |

FOREIGN PATENT DOCUMENTS

| | | |
|---|---|---|
| CN | 113551788 A | 10/2021 |
| CN | 116430359 A | 7/2023 |
| WO | 2022156000 A1 | 7/2022 |

OTHER PUBLICATIONS

Ding, Heping et al., "Localization of off-axis multiple acoustic vortices formed by two coaxial vortex beams," Acta Acustica, vol. 45, No. 1, pp. 62-68 (Jan. 2020).

Cheng, Xiaolong et al., "Weak target detection in sea clutter background based on phase-slope of complex correlation," Periodical of Ocean University of China, 50(8), pp. 131-136 (Aug. 2020).

\* cited by examiner

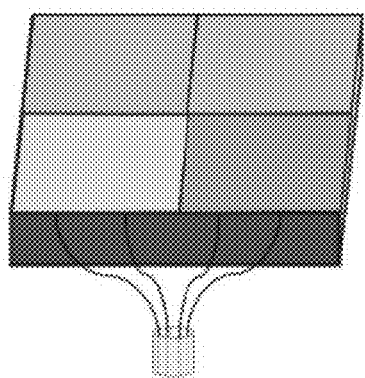
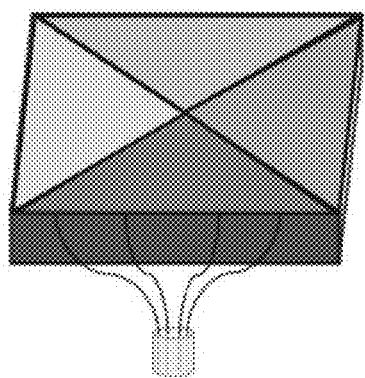
FIG. 2
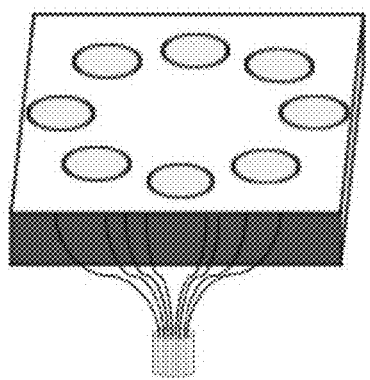

METHOD FOR TARGET DETECTION BASED ON CORRELATION ANALYSIS OF SPATIAL PHASE IN AN ACOUSTIC VORTEX

CROSS-REFERENCE TO RELATED APPLICATION

The subject application claims priority on Chinese Patent Application No. CN202410582905.8 filed on May 11, 2024 in China. The contents and subject matters of the Chinese priority application are incorporated herein by reference.

TECHNICAL FIELD

The subject invention belongs to the field of sonar detection technology, and particularly relates to a method for target detection based on spatial phase correlation analysis of acoustic vortices, which is applicable to acoustic detection of targets in underwater and aerial environments.

BACKGROUND ART

With the development of the detection technology and increasing demands of practical applications, the ability to detect small targets, especially those with dimensions close to or smaller than the wavelength of the incident waves, has become increasingly important. Traditional detection systems are limited by the diffraction limit, which is proportional to $\lambda F/D$, where $\lambda$ is the wavelength of the incident wave, F is the focal length of the transducer system, and D is the aperture size. The smaller the diffraction limit, the higher the spatial resolution of the detection system, meaning that resolution is directly proportional to the aperture size and inversely proportional to the wavelength. The diffraction limit restricts the minimum spatial scale of objects that traditional detection methods can identify. To overcome the limitation, traditional methods typically increase the frequency or enlarge the aperture. However, increasing frequency leads to greater attenuation of the waves, thereby reducing detection range. Enlarging the aperture also faces challenges such as increased cost and compatibility issues with existing equipment. Therefore, traditional detection methods are significantly limited in detecting small targets. With the trend of miniaturization and unmanned operation of future maritime and aerial equipment, the effective detection of small underwater targets has become an urgent problem in the field of underwater acoustics.

Acoustic vortices are a special type of sound wave that has been widely applied in the field of biomedical engineering. These vortices carry orbital angular momentum, with wavefronts that twist around their axis, forming a zero-amplitude center due to destructive interference at the center. The phase of an acoustic vortex spirals around its center, and the phase change along any concentric circle around the vortex center is always $2\pi l$, where l is the topological charge of the vortex. One important characteristic of acoustic vortices is the dramatic change of phase referred to as "super-oscillation" near the vortex center, thereby forming a phase singularity at the vortex center. When these vortices interact with targets of different materials, shapes, and sizes, the modulated spatial phase information exhibits distinct features. The spatial phase information, which is highly sensitive to the position and characteristics of the target, provides a new dimension for target detection. Using the spatial phase information of acoustic vortices for target detection is not limited by the diffraction limit that constrains traditional detection methods. The feature makes acoustic vortices a promising tool for overcoming the challenges of detecting small and medium-sized targets, especially in underwater environments.

SUMMARY OF THE INVENTION

Aiming at the deficiencies of existing technologies and the scattering mechanisms of acoustic vortices as well as the spatial phase modulation characteristics of targets on acoustic vortices, the present invention provides a method for target detection based on spatial phase correlation analysis of acoustic vortices. The method of the present invention is capable of breaking through the diffraction limit and achieving detection of small targets without being restricted by the diffraction limit.

The present invention provides a method for target detection based on spatial phase correlation analysis of acoustic vortices, comprising the following steps: generating a vortex-like excitation acoustic field; receiving the scattered acoustic pressure information after the incidence of the acoustic vortex; and extracting the correlation coefficient between the spatial phase of the scattered acoustic field and a reference phase matrix, and predicting the presence, size, and spatial orientation of the target to achieve the target detection function.

The working principle of the present invention is as follows. The incident acoustic vortex is a type of acoustic field with a spatial phase singularity. When scattered by a target, its spatial phase distribution is modulated and altered, providing a new dimension of information for target detection. When the acoustic vortex is incident on the target off-axis, the offset of the spatial phase correlation spectrum is linearly related to the axial distance and lateral offset distance between the target and the acoustic source axis. By combining the scattered spatial phase information with the linear relationship of the correlation spectrum offset, the actual position of the target can be calculated, thereby achieving the functions of detecting the presence, spatial scale, and orientation of the target.

In the present invention, the method for target detection based on spatial phase correlation analysis of acoustic vortices comprises the following steps:

S1. Transmit an acoustic vortex signal to generate an acoustic vortex.

S2. Inspect and calibrate the acoustic vortex field, and extract a matrix of a certain size centered on the phase singularity as the reference matrix for cross-correlation analysis.

S3. Transmit the acoustic vortex signal towards the region of interest.

S4. Receive the forward-scattered and/or backward-scattered signals from the region of interest.

S5. Perform correlation analysis on the received scattered signals to predict the presence and size of the target; extract the distribution characteristics of the phase singularity to obtain the linear relationship of the acoustic vortex phase singularity offset.

S6. Based on the linear relationship of the acoustic vortex phase singularity offset, detect and identify the actual position of the target.

In the present invention, preferably, the transmission of the acoustic vortex signal employs an active acoustic vortex transmission system and/or a passive acoustic vortex transmission system. The active acoustic vortex transmission system can be composed of a transducer array made up of multiple transducer elements. The passive acoustic vortex transmission system comprises a finite-aperture quasi-plane wave incident on a spiral phase modulator, such as an acoustic prism, circumferential gradient material, or mask plate, which generates an acoustic vortex after diffraction and propagation.

In one preferred embodiment of the present invention, in Step S2, the inspection and calibration refer to comparing the measured results with the calculated results obtained using the angular spectrum method, or judging based on the spatial amplitude and phase distribution characteristics of the acoustic vortex.

In one preferred embodiment of the present invention, in Step S5, the correlation analysis comprises spatial phase cross-correlation analysis and phase correlation analysis. This involves placing the target on the acoustic axis and at a certain offset distance from the acoustic axis, transmitting and receiving acoustic vortex signals, and performing correlation analysis on the received scattered acoustic pressure phase maps to extract the distribution characteristics of the phase singularity. The reference feature matrix for the correlation analysis is the acoustic pressure information at the phase singularity obtained in Step S2. The process establishes a linear relationship between the offset distance of the phase singularity and the axial and lateral offset distances of the target within a certain range.

In one preferred embodiment of the present invention, in Step S4, the reception of forward-scattered and/or backward-scattered signals from the region of interest is performed using a spatial acoustic field reception system composed of a stepping motor and a hydrophone or a hydrophone line array, or by employing a two-dimensional hydrophone array to rapidly measure the spatial acoustic pressure information.

In one preferred embodiment of the present invention, in Step S5, the distribution characteristics of the phase singularity comprise the position of the phase singularity when there is only one single singularity, as well as the positions and arrangement patterns of the phase singularities when there are multiple singularities. The approach leverages the unique properties of phase singularities in acoustic vortices, which can be precisely located and analyzed through methods such as the singularity line technique.

Compared with existing technologies, the present invention has the following advantages:
1. The present invention is unlimited by the diffraction limit. The present invention uses the phase information of acoustic vortices as the basis for detection. It is not restricted by the diffraction limit and can detect small targets with dimensions smaller than the wavelength. The method of the present invention leverages the sensitivity of phase information changes in acoustic vortices scattered by the target to the target's position, thereby improving detection accuracy.
2. The present invention overcomes the diffraction limit of conventional plane waves. The present invention provides a method based on spatial phase information and correlation techniques under acoustic vortex incidence, which can break through the diffraction limit of conventional plane wave target detection. It enables the detection of small targets and their spatial positions. Compared with traditional coherent sound sources such as plane waves, spherical waves, and cylindrical waves, the present invention uses acoustic vortices as the information carrier, providing new ideas and technical solutions for the field of target detection.

BRIEF DESCRIPTION OF THE DRAWINGS

FIG. 2 shows an example of the active acoustic vortex transmission system in the present invention.

FIG. 5A shows the relationship between the horizontal offset distance of the phase singularity and the distance from the target to the acoustic source plane; and FIG. 5B shows the relationship between the horizontal offset distance of the phase singularity and the horizontal offset distance of the target from the acoustic vortex axis. The vertical axis in both FIGS. 5A and 5B shows horizontal offset distance of the phase singularity ($\lambda$).

DETAILED DESCRIPTION OF THE INVENTION

The present invention is further explained in conjunction with the examples and the drawings. However, the specific examples and drawings should not be construed as limiting the scope of protection of the present invention.

Figure 1:
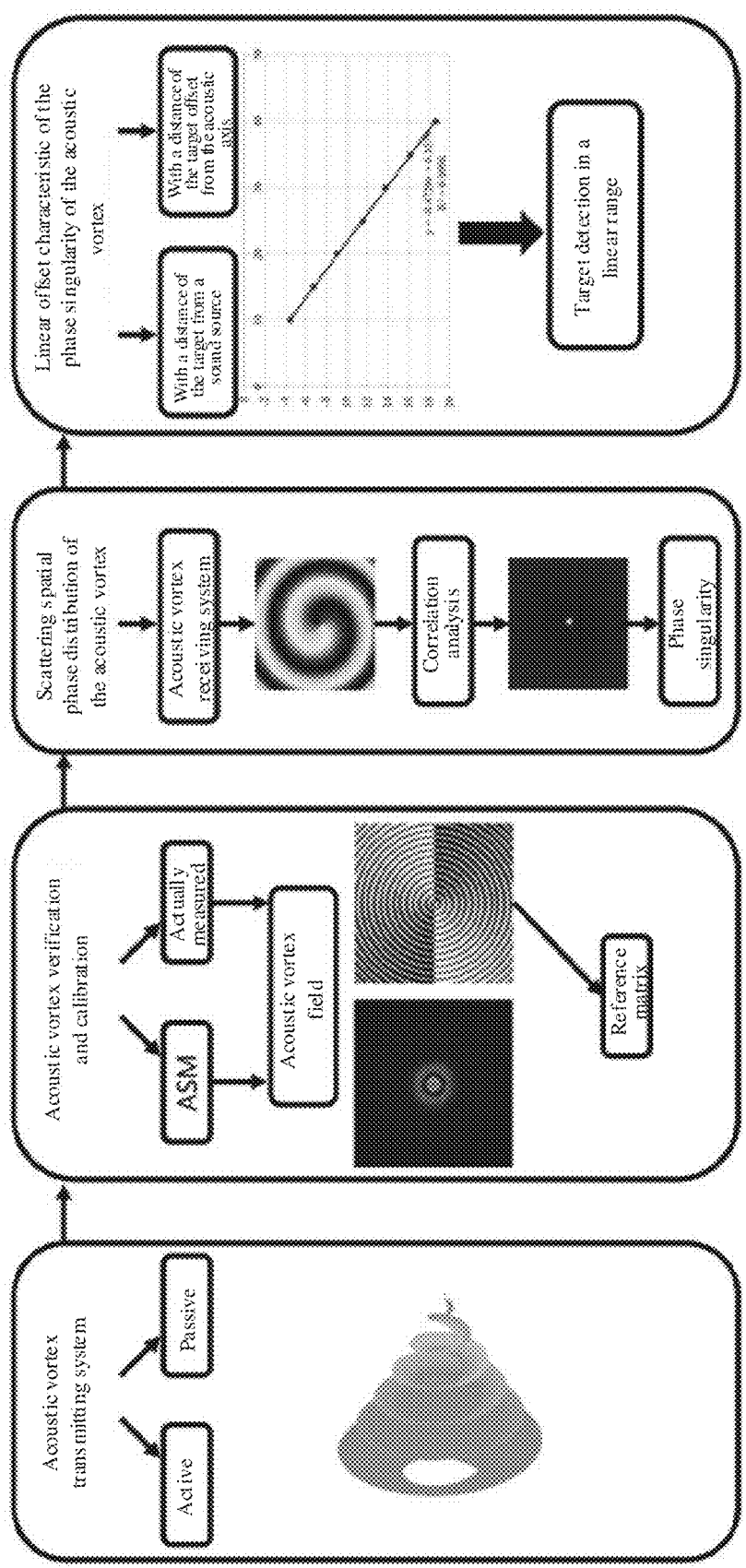
FIG. 1 is a flowchart showing the target detection method based on spatial phase correlation analysis of acoustic vortices according to the present invention.

As shown in FIG. 1, the method for target detection based on spatial phase correlation analysis of acoustic vortices of the present invention comprises the following steps.

Generating an acoustic vortex field. The acoustic vortex transmission system used in the subject invention is shown in FIG. 2. After the acoustic vortex field is fully formed at a certain distance from the transducer plane, the generated acoustic vortex field is inspected and calibrated to assess the quality of the generated acoustic vortex.

Figure 6:
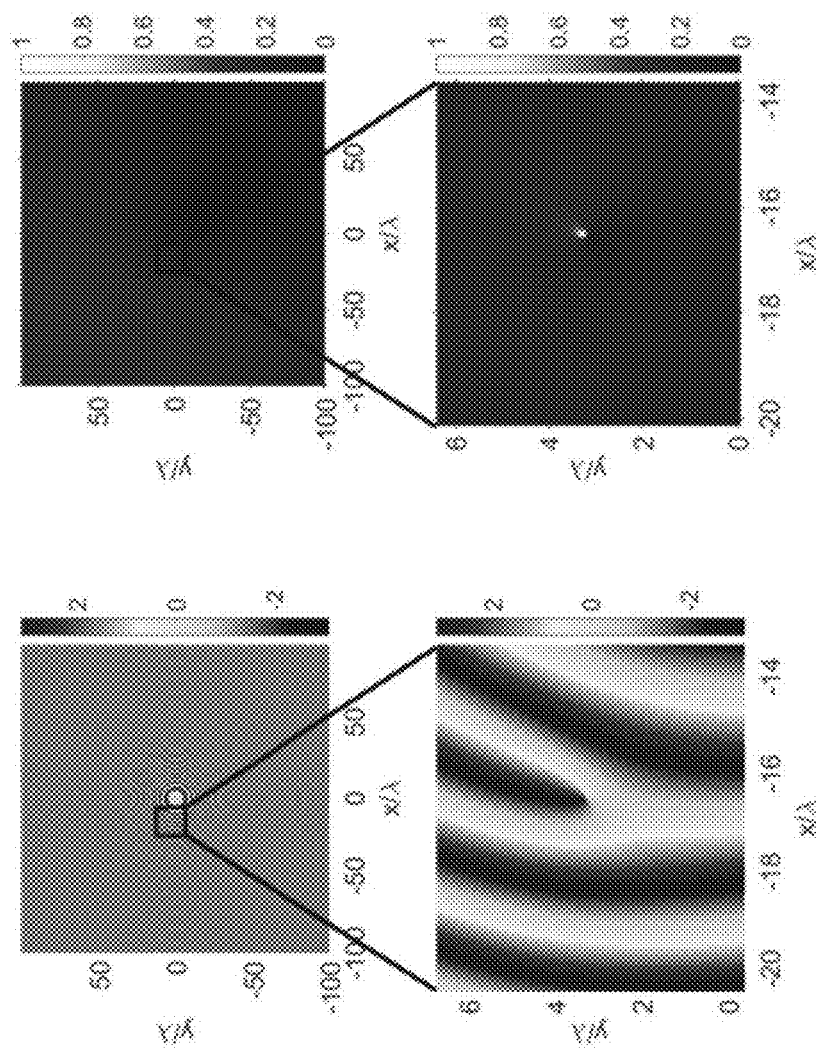
FIG. 6 shows the distribution of acoustic pressure phase in the backward-scattered field and the corresponding correlation map in the present invention.

Inspection and Calibration of Acoustic Vortices. A matrix of a certain size centered on the phase singularity is extracted as the reference matrix for cross-correlation analysis. The smaller the matrix, the more accurate the cross-correlation analysis. FIG. 6 shows the cross-correlation map during backscattering, where only one point with a correlation coefficient equal to 1 can be observed. This point corresponds to the phase singularity, indicating that the cross-correlation accurately identifies the position of the phase singularity.

Figure 3:
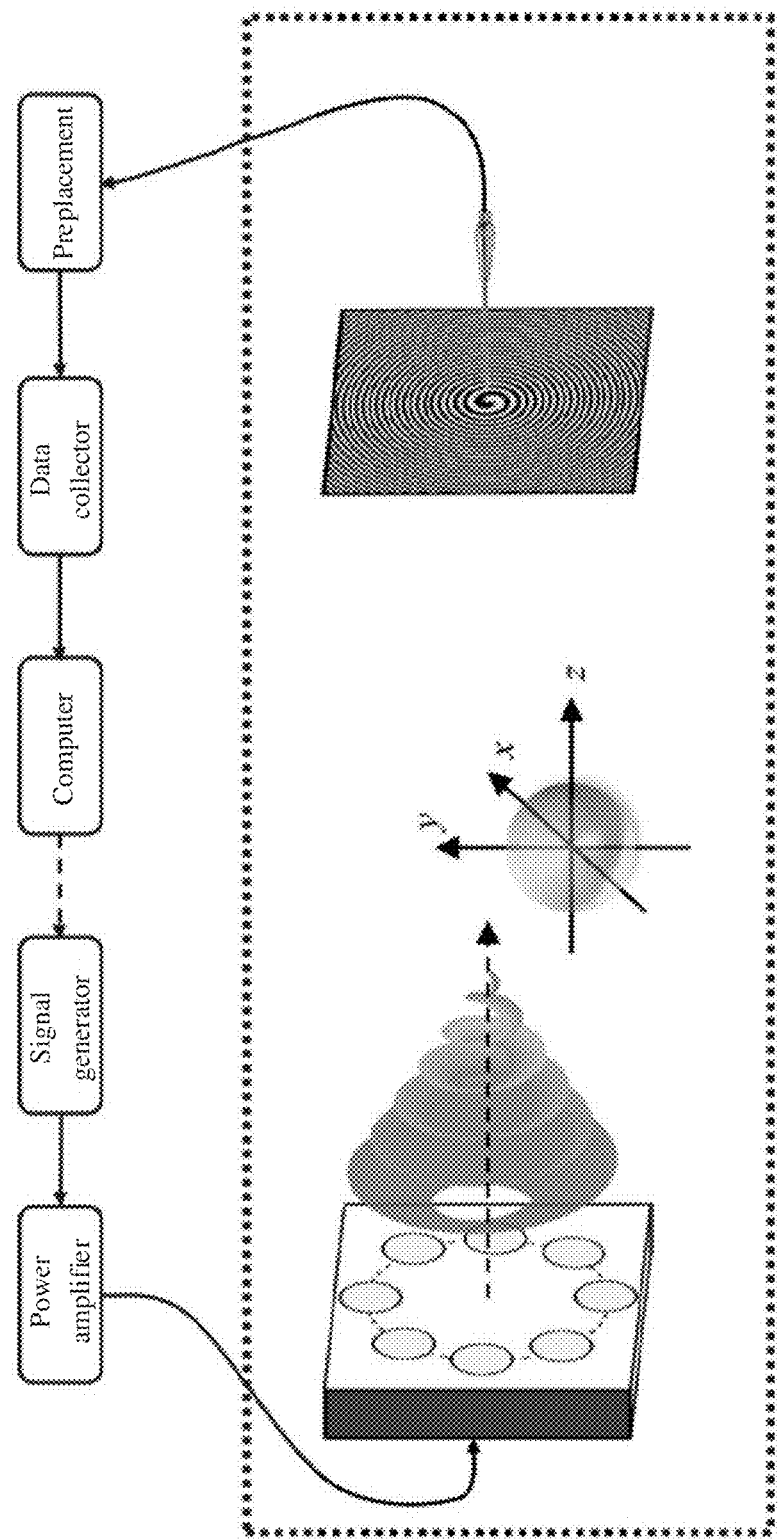
FIG. 3 is a schematic diagram showing the forward scattering process in the present invention.
Figure 4:
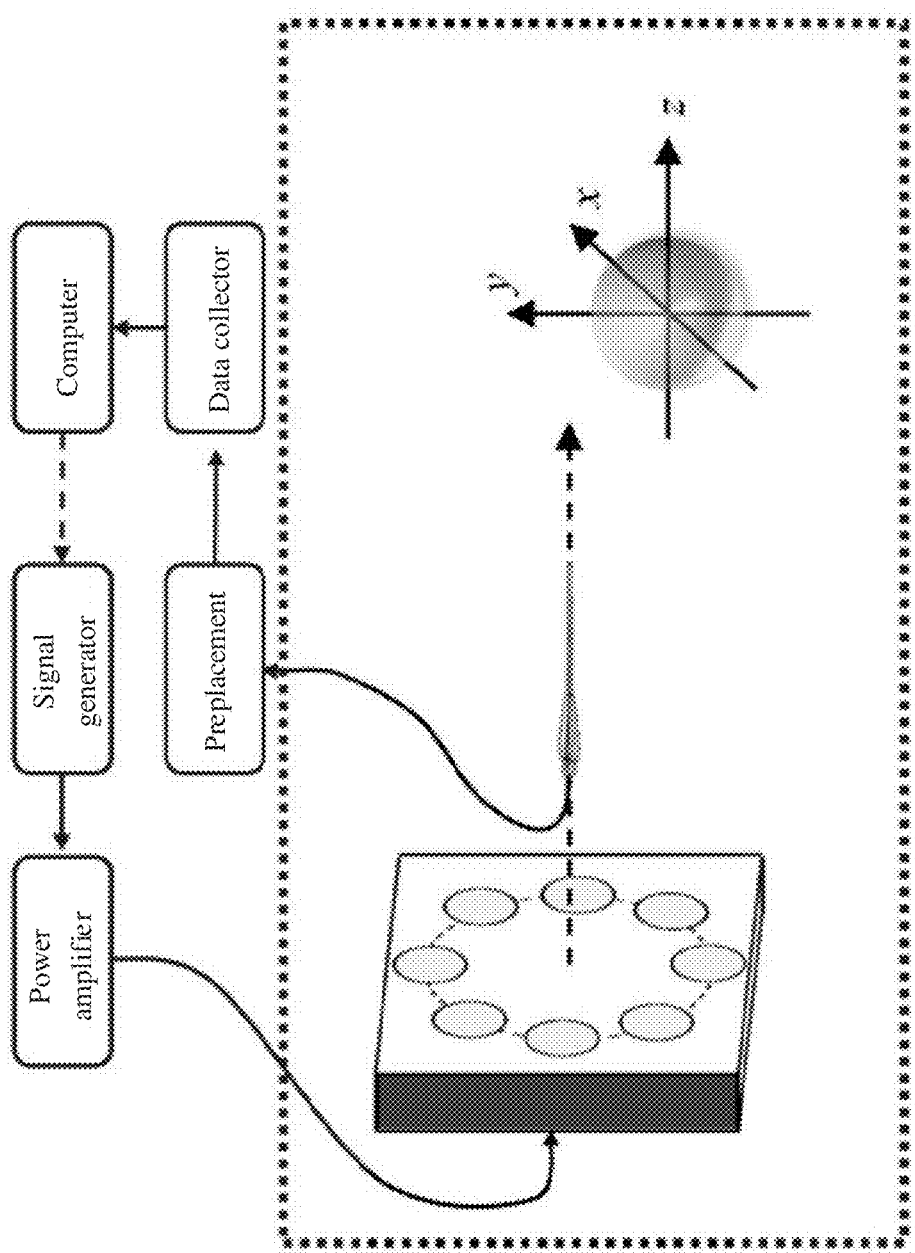
FIG. 4 is a schematic diagram showing the backward scattering process in the present invention.

Obtaining the Spatial Phase Distribution of Acoustic Vortex Scattering. The forward scattering process of the target described in the subject invention is shown in FIG. 3, and the backward scattering process is shown in FIG. 4. Initially, the target is placed at a distance \(d\) from the acoustic source plane. At least 2 to 4 different offset distances from the acoustic axis are set, with the offset distances within the radius of the target. The acoustic vortex reception system scans the acoustic pressure field signals on the receiving surface. The positions of the phase singularities are extracted for each working condition.

Obtain the distribution of phase singularities and the linear relationship with the actual position of the target. After scattering by the characteristic acoustic vortex, the phase singularities propagate along the radial direction.

Figure 5B:
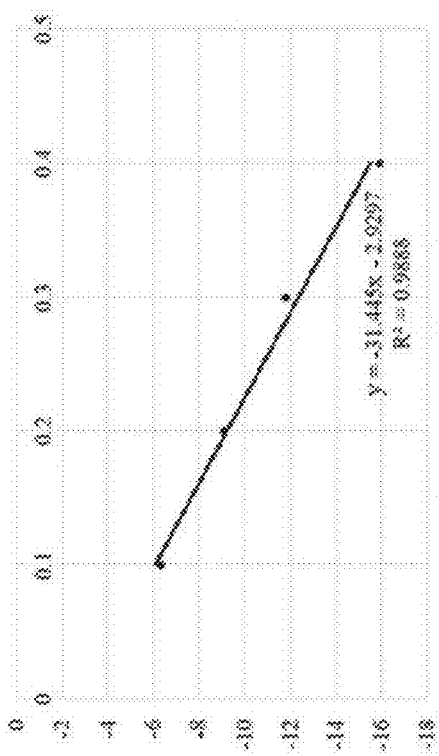
FIGS. 5A and 5B show the linear relationship between the offset of the phase singularity and the actual position of the target in the present invention, where
Figure 5A:
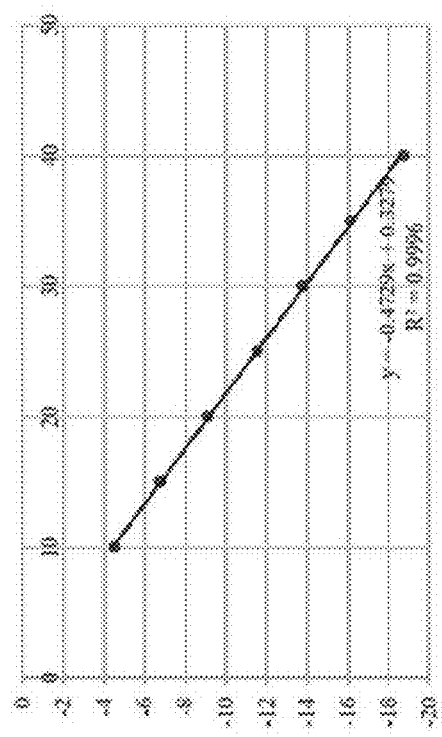

Therefore, the offset distance of the phase singularities is linearly related to the distance from the target to the acoustic source plane of the acoustic vortex, as shown in FIG. 5A. Additionally, based on the experiments conducted in the previous step, the relationship between the offset distance of the phase singularities and the actual offset distance of the target is obtained. By fitting the corresponding linear regression equations, target detection within the linear range can be achieved.

The acoustic vortex transmission system, used for generating acoustic vortex signals, comprises both active and passive acoustic vortex transmission systems. The acoustic vortex signals can be either focused or unfocused acoustic vortices.

The acoustic vortex reception system is used to receive the scattered signals after the incidence of the acoustic vortex. The scattered signals comprise forward-scattered and/or backward-scattered signals.

The active acoustic vortex transmission system consists of a transducer array made up of multiple transducer elements. By individually controlling each transducer element to emit signals with equal phase intervals, the interference of these signals generates an acoustic vortex field.

The passive acoustic vortex transmission system involves directing a plane wave onto a specially designed spiral phase modulator such as an acoustic prism, circumferential gradient material, or mask plate. After diffraction and propagation, the system generates an acoustic vortex.

The acoustic vortex reception system, used for receiving scattered signals after the incidence of acoustic vortices, can be composed of a stepping motor and a hydrophone or a hydrophone line array. This system scans the amplitude and phase information of the acoustic pressure field on the receiving surface. For forward-scattered spatial acoustic field measurements, a two-dimensional hydrophone array can be used to rapidly test the spatial acoustic pressure information.

The correlation analysis described in the present invention comprises spatial phase cross-correlation analysis and phase correlation analysis. The specific steps are as follows:

(1) No Target Present, Using the acoustic vortex transmission system, an acoustic vortex signal is emitted. After the acoustic vortex is fully formed at a certain distance from the acoustic source plane, the signal is collected. The received acoustic vortex signal is processed to obtain the amplitude and phase distribution of the acoustic pressure field at the receiving plane. This distribution is then inspected and calibrated by comparing the measured results with the calculated results obtained using the angular spectrum method.

(2) No Target Present, The position of the phase singularity is observed and recorded. The location of the phase singularity reflects the center of the acoustic axis. The acoustic pressure information at the receiving plane is recorded as the reference matrix for correlation analysis. When using cross-correlation analysis, the reference matrix is centered on the acoustic axis, i.e., the phase singularity, and is of a certain size. The smaller the matrix, the more accurate the cross-correlation analysis.

(3) Target Present, The target is placed both on the acoustic axis and at a certain offset distance from the acoustic axis. The acoustic vortex signal is emitted and received, and the scattered acoustic pressure phase map is analyzed. The distribution characteristics of the phase singularity are extracted. The reference feature matrix for correlation analysis is the acoustic pressure information at the phase singularity obtained in step (2). A linear relationship is established between the offset distance of the phase singularity and the distance from the target to the acoustic axis and the acoustic source plane within a certain range. The distribution characteristics of the phase singularity comprise the position of the singularity when there is only one singularity, and the position and arrangement of multiple singularities when there are multiple singularities.

(4) Target Present: When the target is located at an arbitrary position, the scattered acoustic field is analyzed in the same manner. The distribution characteristics of the phase singularity are analyzed, and the linear nature of the phase singularity offset is used to determine the presence of the target and calculate its actual position.

The target detection method using spatial phase correlation analysis of acoustic vortices in the subject invention is based on the super-oscillation characteristics of the phase of acoustic vortices and the distribution of scattered phase information. When an acoustic vortex is scattered by a target, the phase singularity shifts, and the amount of this shift is linearly related to the distance from the target to the acoustic source plane and the distance by which the target deviates from the acoustic axis within a certain range. Through this linear relationship, the actual position of the target can be calculated from the position of the scattered phase singularity under any working condition, thereby achieving target detection.

EXAMPLE

The following is an example of target detection using spatial phase correlation analysis of acoustic vortices.

An ideal Bessel acoustic wave was used as the incident acoustic vortex. The frequency was selected to be 14 kHz. The target was a tungsten carbide sphere with a diameter of one wavelength, surrounded by a water medium.

When there is no target, the acoustic pressure field information of the fully formed acoustic vortex is recorded. A 5×5 matrix centered on the phase singularity is selected as the reference matrix for cross-correlation analysis. Considering the monostatic configuration, the backward-scattered information from the target is received on the acoustic source plane.

When a target is present, initially, the target is positioned 20 wavelengths away from the acoustic source plane to satisfy the far-field scattering condition. Subsequently, the target is horizontally offset, and the phase distribution maps of the scattered field are obtained for offset distances of 0.1, 0.2, 0.3, and 0.4 wavelengths. Cross-correlation analysis is performed between these maps and the reference matrix, accurately locating the phase singularity with a correlation coefficient of 1. The horizontal offset distance of the phase singularity is recorded, and a linear relationship between the phase singularity offset and the actual target offset is established, resulting in a corresponding linear regression equation as shown in FIG. 5B.

Based on the relationship, it is calculated that when the target is 32 wavelengths away from the acoustic source plane and has a horizontal offset of 0.25 wavelengths, the horizontal offset distance of the phase singularity is −16.5184 wavelengths. The corresponding correlation map is shown in FIG. 6, where the actual horizontal offset distance of the phase singularity is −16.5 wavelengths, which matches very well with the calculated value.

The Example demonstrates that target detection can be achieved at any distance from the acoustic source plane of the acoustic vortex and at any horizontal offset distance within 0.4 wavelengths.

We claim:

1. A method for target detection based on spatial phase correlation analysis of an acoustic vortex, comprising:

(1) in a calibration phase, performing the steps of:

transmitting an acoustic vortex signal to generate an acoustic vortex at a distance from a sound source plane, receiving the acoustic vortex signal and processing the received acoustic vortex signal to obtain an acoustic pressure amplitude and phase distribution of the acoustic vortex at a receiving plane, verifying and calibrating the acoustic vortex by comparing the phase distribution of the acoustic vortex with phase distribution calculated using angular spectrum method, identifying and recording a position of a phase singularity of the acoustic vortex signal, wherein the position of the phase singularity corresponds to a center of an acoustic axis of the acoustic vortex, and taking a two-dimensional reference matrix, wherein the center of the two-dimensional reference matrix is on the acoustic axis and phase singularity of the acoustic vortex;

(2) in a relationship establishment phase, performing the steps of:

placing a reference target at the acoustic axis of the acoustic vortex and at a series of lateral offset distances from the acoustic axis of the acoustic vortex, wherein the series of the lateral offset distances are within a radius of the reference target, transmitting the acoustic vortex signal to generate the acoustic vortex as verified and calibrated in the calibration phase toward the reference target at the acoustic axis of the acoustic vortex and at the series of lateral offset distances from the acoustic axis of the acoustic vortex, and receiving scattered acoustic pressure signals from the reference target at the receiving plane, processing the received scattered acoustic pressure signals to obtain scattered acoustic pressure phase distribution and performing two-dimensional spatial cross-correlations between the scattered acoustic pressure phase distribution and the two-dimensional reference matrix to obtain distribution of the phase singularities of the acoustic vortices with positions of the reference target being at the acoustic axis and at the lateral offset distances from the acoustic axis, and establishing a linear relationship between offset distance of the phase singularity of the acoustic vortex and the lateral offset distance of the reference target from the acoustic axis and a linear relationship between the offset distance of the phase singularity of the acoustic vortex and an axial distance of the reference target from the sound source plane;

(3) in a detection phase, performing the steps of:

transmitting the acoustic vortex signal to generate the acoustic vortex as verified and calibrated in the calibration phase toward a location to be detected, receiving acoustic pressure signals from the location to be detected at the receiving plane and processing the received acoustic pressure signals from the location to be detected to obtain acoustic pressure phase distribution of the location to be detected, performing two-dimensional spatial cross-correlation between the acoustic pressure phase distribution of the location to be detected and the two-dimensional reference matrix to obtain phase distribution of the phase singularity, analyzing the phase distribution of the phase singularity to determine presence of a target at the location to be detected based on linear offset of the phase singularity, and calculating spatial position of the target present at the location to be detected by based on the linear relationship between the offset distance of the phase singularity of the acoustic vortex and the lateral offset distance of the reference target from the acoustic axis and the linear relationship between the offset distance of the phase singularity of the acoustic vortex and the axial distance of the reference target from the sound source plane as established in the relationship establishment phase.

2. The method of claim 1, wherein the acoustic vortex signal is transmitted by an active acoustic vortex transmitting system, and the active acoustic vortex transmitting system comprises an array of transducer elements.

3. The method of claim 1, wherein the phase distribution comprises a position of a single phase singularity.

4. The method of claim 1, wherein the acoustic vortex signal is transmitted by a passive acoustic vortex transmitting system, and the passive acoustic vortex transmitting system comprises a helical phase modulator configured to diffract a finite-aperture quasi-plane wave to form the acoustic vortex.

5. The method of claim 1, wherein the phase distribution comprises positions and arrangement of multiple phase singularities.

* * * * *